I. B. KEMPSHALL.
AUTOMOBILE TIRE.
APPLICATION FILED JULY 22, 1909.
945,396.
Patented Jan. 4, 1910.
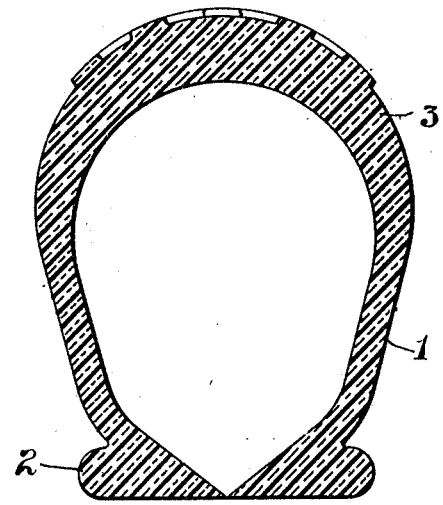
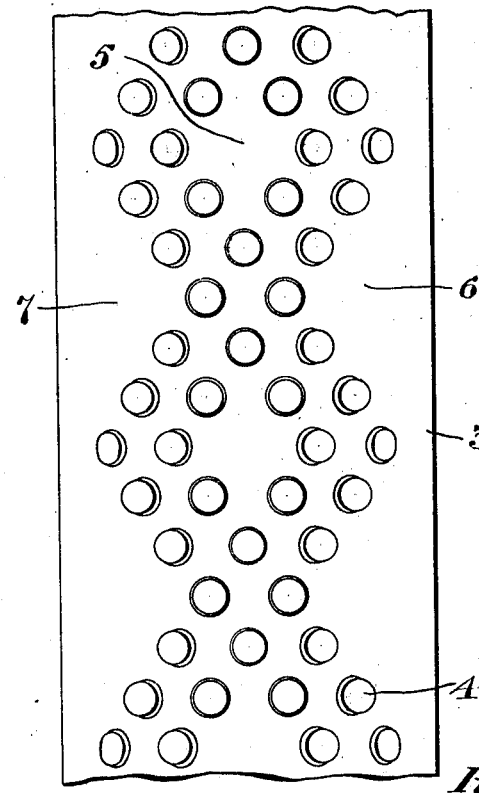

UNITED STATES PATENT OFFICE.

IVA BELLE KEMPSHALL, OF BOSTON, MASSACHUSETTS.

AUTOMOBILE-TIRE.

945,396.

Specification of Letters Patent.  Patented Jan. 4, 1910.

Application filed July 22, 1909. Serial No. 508,959.

*To all whom it may concern:*

Be it known that I, IVA BELLE KEMPSHALL, of Boston, in the county of Suffolk and State of Massachusetts, have invented certain new and useful Improvements in Automobile-Tires, of which the following is a specification.

This invention relates to an improvement in automobile tires, and consists in the provision of means to prevent skidding of the tire.

Figure 1 is a cross-sectional view of a tire constructed in accordance with my invention, showing the tread surfaces of the tire provided with anti-skidding means. Fig. 2 is a plan view of the tread surface of the tire, showing the anti-skidding projections on the surface of the tire, their construction and arrangement with particular reference to the central holding pockets and the side gripping angles formed by the omission of the projections.

The same symbols of reference indicate the same parts in all of the figures.

1 represents an automobile tire of any preferred construction. As here shown, it is formed with parts 2, adapted to be engaged by rims for binding the tire on the wheel. I have not shown the inner tube nor the wheel, because these parts, as well as the part 2, may be of any well known or preferred construction and form no part of my invention, which consists in the particular construction of the tread surface 3 of such tires. As will be seen, this tread surface is formed with a plurality of frusto-conical shaped projections 4, Fig. 1 showing some of the projections in cross section.

Referring to Fig. 2, it will be seen that along the central line of the tread surface the projections 4 are omitted at predetermined points, forming center pockets 5. In like manner the projections 4 are omitted at predetermined points on each side of the tread surface, forming side pockets 5, 7, opposite each other.

The projections 4 extend in a continuous series circumferentially around the tire, and the width of the series is alternately increased and decreased to form the side pockets 6 and 7. The bottoms of said side pockets curve outwardly to the sides of the tire. The projections forming the wider portions of the series are arranged to surround the central pockets 5, one or more of the projections being omitted from the center of each of the wider portions.

In the operation of the tire, not only is skidding resisted by the projections 4 themselves, but said resistance to skidding is greatly increased by reason of the pockets 5, 6, and 7, the action of the pockets in connection with the action of the projections holding the tire against skidding action.

By reason of the fact that the portions of the tread or outer surface of the tire which form the bottoms of the pockets 6, 7, curve outwardly and merge into the sides of the tire, the tire is enabled to tip sidewise in either direction, thus increasing the contact between the bottoms of the side pockets at one side of the series of projections with the track, and enabling the projections which form the margins of said side pockets to engage the track in such manner as to reduce the possibility of skidding to the minimum.

While I have shown my invention adapted for use with a wear member of a pneumatic tire, I do not wish to be understood as limiting my invention to a pneumatic tire, as it is equally applicable and intended for use upon all classes of resilient tires, whether solid, pneumatic, cushion, or otherwise.

Having thus explained the nature of my invention and described a way of constructing and using the same, though without attempting to set forth all of the forms in which it may be made, or all of the modes of its use, what I claim and desire to secure by Letters Patent is:—

An anti-skidding tire for automobiles, provided with a series of projections extending circumferentially around the tread of the tire, the width of the series of projections being alternately increased and diminished to form side pockets 6 and 7, the bottoms of which curve outwardly and merge into the sides of the tire, and the projections forming the wider portions of the series being arranged to form central pockets 5 alternating with the side pockets.

In testimony whereof I have affixed my signature, in presence of two witnesses.

IVA BELLE KEMPSHALL.

Witnesses:
H. L. ROBBINS,
P. W. PEZZETTI.